UNITED STATES PATENT OFFICE.

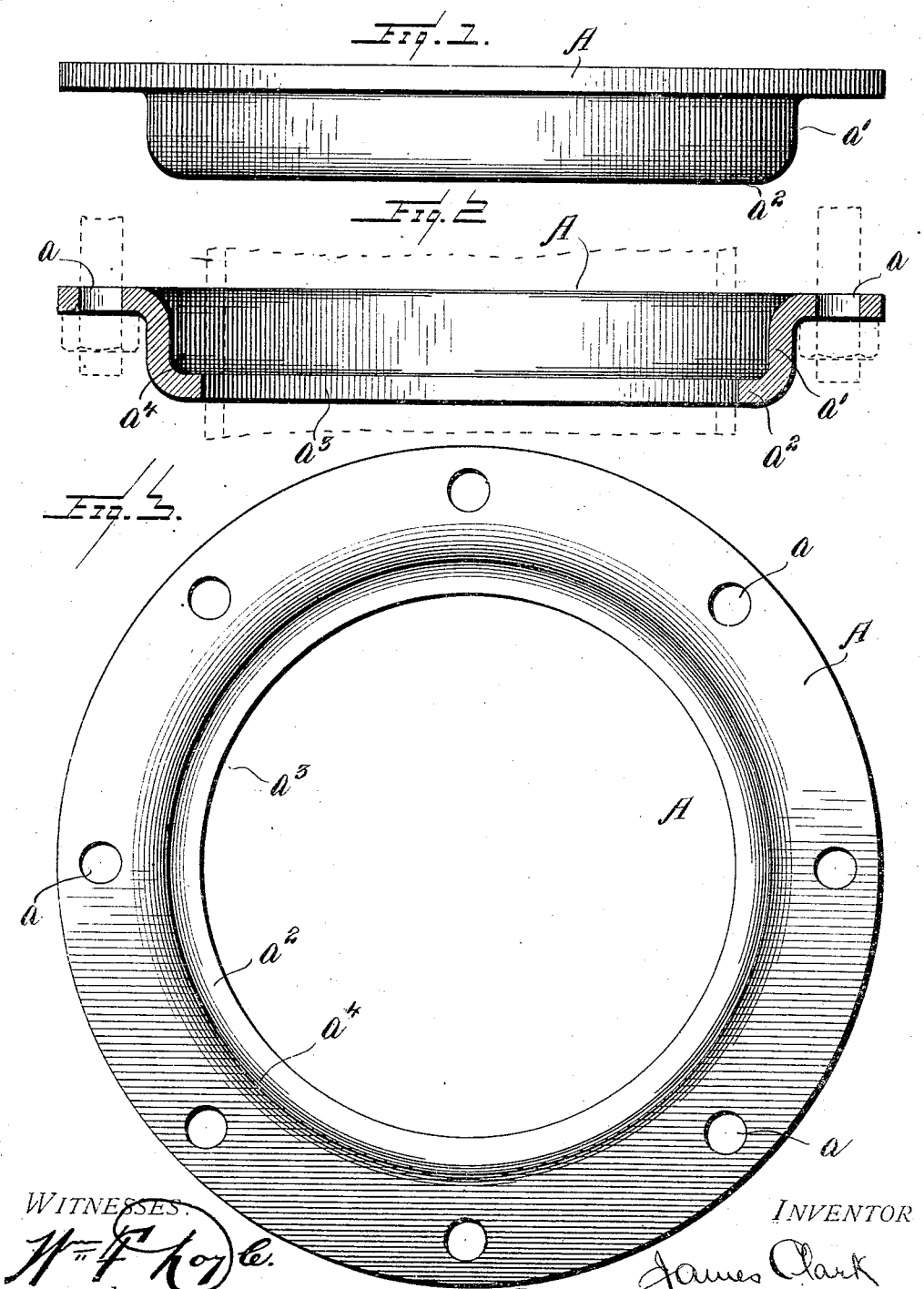

JAMES CLARK, OF BRADFORD, PENNSYLVANIA, ASSIGNOR TO S. R. DRESSER MANUFACTURING COMPANY, OF BRADFORD, PENNSYLVANIA.

CLAMPING-RING.

No. 872,899.      Specification of Letters Patent.      Patented Dec. 3, 1907.

Application filed December 17, 1906. Serial No. 348,302.

*To all whom it may concern:*

Be it known that I, JAMES CLARK, citizen of the United States, residing at Bradford, in the county of McKean and State of Pennsylvania, have invented certain new and useful Improvements in Clamping-Rings; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one form in which I have contemplated embodying my invention and said invention is fully disclosed in the following description and claims.

The object of my invention is to provide a clamping ring for pipe couplings, constructed of wrought metal such as wrought iron or steel which shall provide an annular plate portion disposed perpendicularly to the axis of the ring, and provided with bolt holes, and having its inner marginal portions bent at an angle thereto to form an annular flange portion, the outer edge of said flange portion being bent inwardly, substantially parallel to the plate portion to form a packing recess and to provide a circular aperture for the passage of a pipe section therethrough.

In the drawings, Figure 1 represents an elevation of a clamping ring embodying my invention. Fig. 2 represents a sectional view of the same, and Fig. 3 is a plan view of the same.

The herein described clamping ring is formed in one piece and is conveniently formed by forging or stamping the same from sheet metal, such as wrought iron or steel, although it may be formed in other ways if desired.

A represents the annular flat plate portion of the ring disposed substantially perpendicularly to the axis of the ring and provided at suitable intervals with bolt holes $a$ of any desired size or shape. The inner marginal portions of the plate portion are bent at an angle thereto (and preferably perpendicularly) on one side, as indicated at $a'$ to form an annular flange portion at the inner edge of said plate portion, the outer edges of which flange portion are bent inward as at $a^2$ substantially parallel to the plate portion A. The edge of the inwardly extending annular portions $a^2$, forms a circular pipe aperture $a^3$ for the passage of a pipe section (shown in dotted lines in Fig. 2) therethrough, and said inwardly bent portions $a^2$ also form an annular packing recess $a^4$, for the reception of an annular packing ring (not shown) which will lie between the flange portion $a'$ and the pipe section, as will be readily understood, the inwardly extending portions $a^2$, forming the bottom of said packing recess. The inner diameter of the plate portion $a$ is obviously considerably greater than that of the pipe aperture $a^3$, as shown.

What I claim and desire to secure by Letters Patent is:—

A clamping ring for pipe couplings formed in one piece from wrought metal, and having an annular plate portion disposed substantially perpendicularly to the axis of said ring and provided with bolt holes, an annular flange portion extending from the inner edge of said plate portion substantially perpendicularly thereto and on one side of the same, and having at its outer end an inwardly extending annular flange substantially parallel with said plate portion forming a packing recess, and providing a central pipe aperture, the inner diameter of said plate portion being greater than that of the said pipe aperture, substantially as described.

In testimony whereof I affix my signature, in the presence of two witnesses.

JAMES CLARK.

Witnesses:
F. P. SCHOONMAKER,
LEONA G. ANDREWS.